United States Patent
Thomas et al.

(10) Patent No.: US 10,764,108 B2
(45) Date of Patent: Sep. 1, 2020

(54) UNIFIED DATA TRANSFER VIA IPMI

(71) Applicant: American Megatrends International, LLC, Norcross, GA (US)

(72) Inventors: Satheesh Thomas, Dunwoody, GA (US); Muthuchamy Kumar, Chennai (IN)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 178 days.

(21) Appl. No.: 15/251,164

(22) Filed: Aug. 30, 2016

(65) Prior Publication Data
US 2018/0063225 A1 Mar. 1, 2018

(51) Int. Cl.
*H04L 29/08* (2006.01)
*H04L 12/24* (2006.01)

(52) U.S. Cl.
CPC ................ *H04L 41/0213* (2013.01)

(58) Field of Classification Search
None
See application file for complete search history.

(56) References Cited

U.S. PATENT DOCUMENTS

| | | | | |
|---|---|---|---|---|
| 7,484,084 B1* | 1/2009 | Ranaweera | ............. | G06F 8/656 713/1 |
| 8,874,922 B2* | 10/2014 | Jaber | ...................... | G06F 21/57 713/153 |
| 8,898,349 B1* | 11/2014 | Mondal | ................. | G06F 13/385 710/15 |
| 2010/0228960 A1* | 9/2010 | Huang | ..................... | G06F 8/65 713/100 |
| 2014/0195704 A1* | 7/2014 | Bhatia | .................... | G06F 13/42 710/105 |

* cited by examiner

*Primary Examiner* — Aaron N Strange
*Assistant Examiner* — Mohammad Yousuf A. Mian
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be an embedded-system device. The embedded-system device receives at least one IPMI message from a client device. The embedded-system device extracts message data from the at least one IPMI message. The embedded-system device determines, from the message data, a function call including at least one operation code and for processing a data collection. The embedded-system device processes the data collection based on the at least one operation code. The disclosure describes a common implementation of data transfer and usage that can serve different clients as well as future features with zero or minimum redesign or redevelopment.

17 Claims, 7 Drawing Sheets

UNIFIED DATA TRANSFER VIA IPMI

BACKGROUND

Field

The present disclosure relates generally to embedded-system devices, and more particularly, to techniques of using a common data operation mechanism to transfer data to and from different feature components at a baseboard management controller (BMC).

Background

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. The BMC may be considered as an embedded-system device.

Different client applications may require transferring files or large amount of data to and from different feature components at a BMC. Often each feature component implements a separate protocol for data transfers. There is a need for a common data operation mechanism that handles the data transfer responsibility for different feature components. There is also a need for a common implementation of data transfer and usage that can serve different clients as well as future features with zero or minimum redesign or redevelopment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device receives at least one IPMI message from a client device. The embedded-system device extracts message data from the at least one IPMI message. The embedded-system device determines, from the message data, a function call including at least one operation code and for processing a data collection. The embedded-system device processes the data collection based on the at least one operation code.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
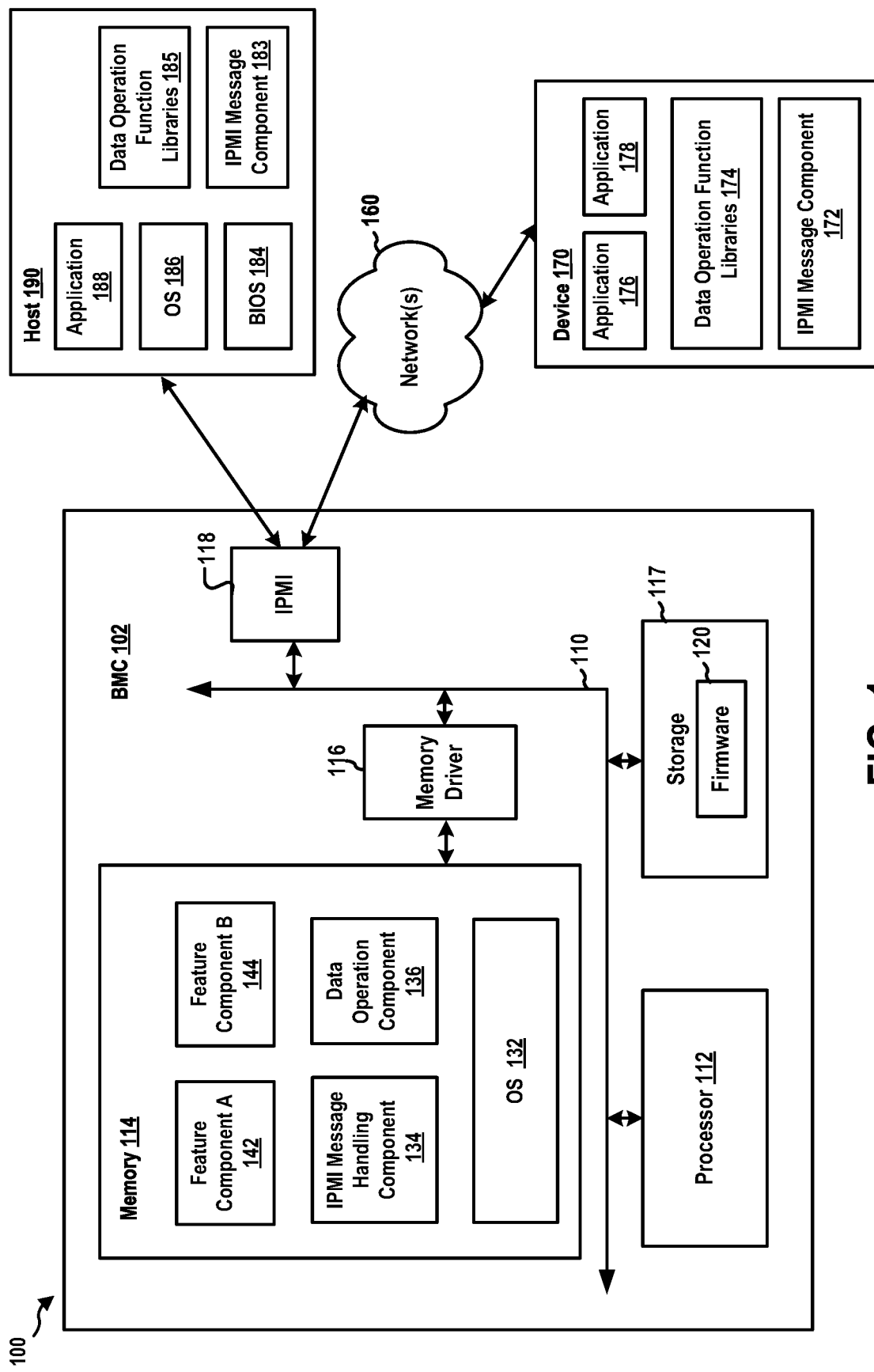
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Different client applications may require transferring files or large amount of data to and from different feature components at a BMC. Often each feature component implements a separate protocol for data transfers. There is a need for a common data operation mechanism that handles the data transfer responsibility for different feature components. There is also a need for a common implementation of data transfer and usage that can serve different clients as well as future features with zero or minimum redesign or redevelopment.

The common data operation mechanism can be pretested and can be used with a common code from the clients. This leads to faster development, and new features may be added in a shorter amount of time. Applications, host Basic Input/Output System (BIOS), and BMCs can all use common library code for data transfer. The common library code may be developed at one time and may be reused. This mechanism may provide a common implementation of data transfer and usage that can serve different clients as well as future features with zero or minimum redesign or redevelopment.

FIG. 1 is a diagram 100 illustrating a computer system. In this example, the computer system includes, among other things, a BMC 102, a host computer 190, and a network device 170. The BMC 102 has a processor 112, a memory 114, a memory driver 116, and a storage 117. Further, the BMC 102 may support IPMI and may have an IPMI interface 118. The IPMI interface 118 may be implemented over a keyboard controller style (KCS), a server management interface chip (SMIC), a block transfer (BT) interface, a system management bus system interface (SSIF), a Universal Serial Bus (USB) interface, a network interface, and/or other suitable communication interface(s). The memory 114, the processor 112, the memory driver 116, the storage 117, and the IPMI interface 118 may be in communication with each other through a communication channel 110 such as a bus architecture.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, an operating system (OS) 132, an IPMI message handling component 134, a data operation component 136, a feature component A 142, and a feature component B 144. Although not shown, the BMC 102 of course may have some other feature components. As described infra, each feature component may provide a feature of the BMC 102 (such as BMC firmware update, host BIOS data backup, etc.).

The BMC 102 may be in communication, through one or more of the communication interface described supra and/or through the IPMI interface 118, with the host computer 190 and/or a network device 170. The BMC may manage the host computer 190. The host computer 190 includes, among other components, a BIOS 184, a host OS 186, an IPMI message component 183, data operation function libraries 185, and a host application 188. When the host computer 190 initially starts, the host computer 190 executes the BIOS 184 in order to boot the host OS 186. The BIOS 184 may perform a POST procedure. The POST procedure includes a series of individual functions or routines that perform various initialization and tests of the computer hardware such as motherboard hardware, a central processing unit (CPU), a math coprocessor, a timer integrated circuit (IC), a Direct Memory Access (DMA) controller, and/or interrupt request (IRQ) controller, etc. The POST procedure may generate data (e.g., POST codes) during execution.

The communications between the BMC 102 and the network device 170 may be carried over a network 160. The network device 170, among other components, includes an IPMI message component 172, data operation function libraries 174, a client application 176, and a client application 178.

The IPMI message component 172 at the network device 170 and the IPMI message handling component 134 at the BMC 102 may communicate IPMI messages with each other through the IPMI interface 118. Similarly, the IPMI message component 183 at the host computer 190 and the IPMI message handling component 134 at the BMC 102 may communicate IPMI messages with each other through the IPMI interface 118.

The data operation function libraries 174 at the network device 170 provide one or more functions that direct the data operation component 136 at the BMC 102 to perform data operations at a feature component. Each function of the data operation function libraries 174 is associated with a data collection and one or more operation codes. As described infra, the operation codes may indicate whether the data collection is to be transferred from the network device 170 to the BMC 102 or to be transferred from the BMC 102 to the network device 170. The operation codes may indicate a location of the data collection. The operation codes may also indicate the feature component at the BMC 102 that is the source or destination of the data collection. The operation codes may also indicate the particular data operations to be performed with the data collection. The operation codes may further indicate a data processing action to be performed on the data collection upon completion of the transfer of the data collection.

In this example, when the client application 176 of the network device 170 wants to transfer a data collection to a particular feature component at the BMC 102, the client application 176 may call a function of the data operation function libraries 174, providing the data collection and corresponding operation codes. As described infra, the data operation function libraries 174 utilize the IPMI message component 172 to transfer the data collection and the operation codes to the IPMI message handling component 134 at the BMC 102 via one or more IPMI messages.

The IPMI message handling component 134 receives the one or more IPMI messages, extracts the data collection and the operation codes, and then sends the data collection and the operation codes to the data operation component 136. The data operation component 136 then instructs the particular feature component to perform the data operations indicated by the operation codes, or then performs, for the particular feature component, the data operations indicated by the operation codes.

In this example, when the client application 178 of the network device 170 wants to receive a data collection from a particular feature component at the BMC 102, the client application 178 may call another function of the data operation function libraries 174, providing location of the data collection and corresponding operation codes. As described infra, the data operation function libraries 174 utilize the IPMI message component 172 to transfer the operation codes to the IPMI message handling component 134 at the BMC 102 via one or more IPMI messages.

The IPMI message handling component 134 receives the one or more IPMI messages, extracts the operation codes, and then sends the operation codes to the data operation component 136. The data operation component 136 then instructs the particular feature component to return the data collection stored at the location as indicated by the operation codes. The data operation then sends the data collection to the IPMI message handling component 134, which then sends the data collection to the BMC 102 in one or more IPMI messages.

Figure 2:
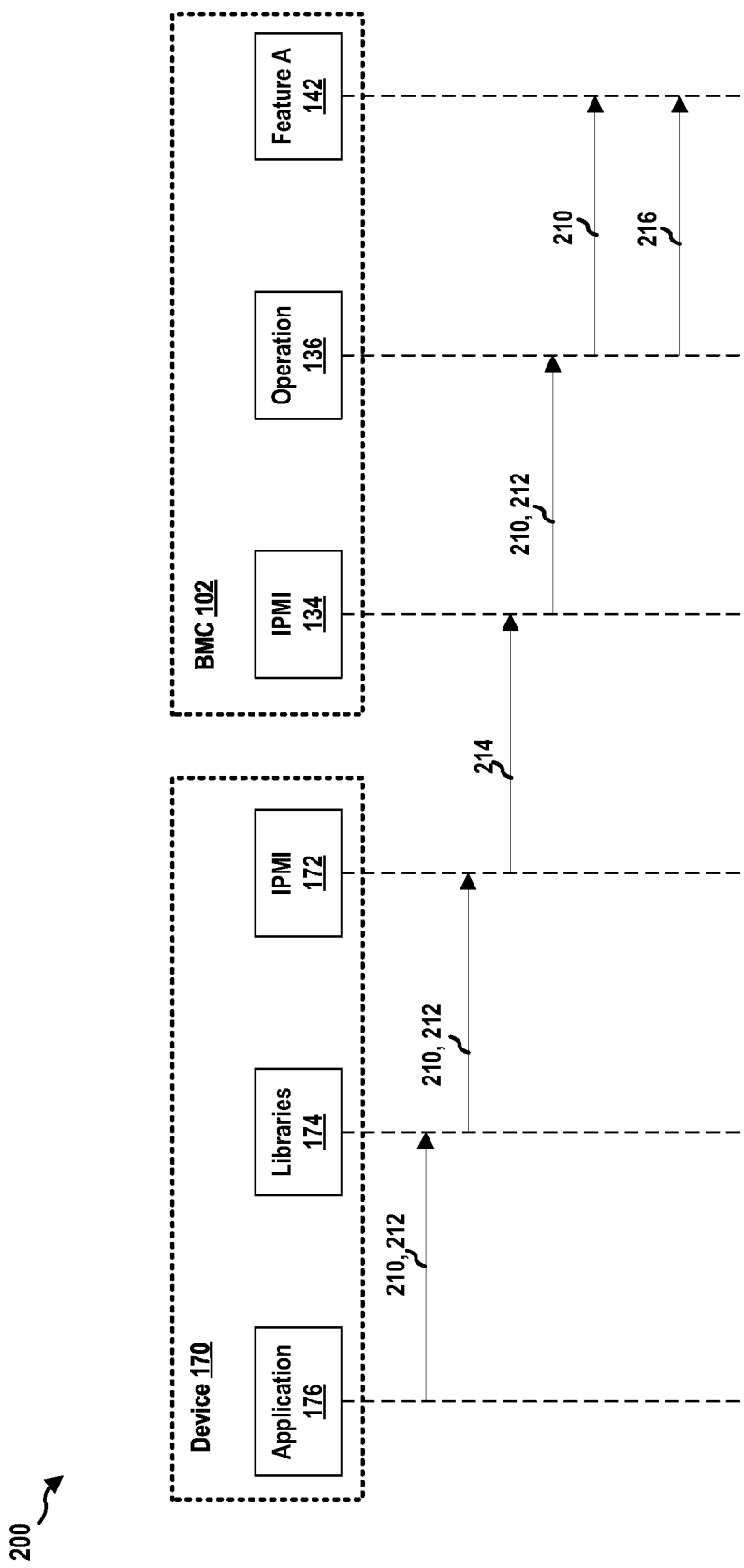
FIG. 2 is a diagram illustrating a sequence of operations for transferring data from a client application to a feature component of a BMC.

FIG. 2 is a diagram 200 illustrating a sequence of operations for transferring data from a client application to a feature component of a BMC. In this example, the client application 176 wants to update the BMC firmware at the BMC 102. The client application 176 may call a function of the data operation function libraries 174. The client application 176 may provide a firmware image 210 to the function as a parameter of the function, which is the data collection to be transferred. The client application 176 further provides one or more operation codes 212 to the function as parameters of the function. The operation codes 212 may also be configured to indicate to the data operation component 136 of the BMC 102 (as described infra) that the firmware image 210 is to be transferred to the feature component A 142, which is a BMC firmware update feature in this example. The operation codes 212 may also be configured to indicate a particular data processing action to be performed on the firmware image 210 by the data operation component 136 upon that the reception of the firmware image 210 is complete. In this example, the particular data processing action indicated is a validation process. Further, in alternative to providing the actual firmware image 210, the client application 176 may provide a location of the firmware image 210 to the function as a parameter. The operation codes 212 may also indicate to the function that the location of the data collection, rather than the actual data, is sent to the function. Accordingly, the function may obtain the actual firmware image 210 from the location (e.g., at a storage device of the network device 170.)

The data operation function libraries 174, through the function, obtains the firmware image 210 and the operation codes 212. Based on the operation codes 212, the data operation function libraries 174 can determine that the firmware image 210 is to be transferred to the BMC 102. The data operation function libraries 174 then send the firmware image 210 and the operation codes 212 to the IPMI message component 172, and indicate that the firmware image 210 and the operation codes 212 are to be sent to the BMC 102. The IPMI message component 172 constructs, e.g., under the instructions of the data operation function libraries 174, one or more IPMI messages 214 and uses specific fields of the IPMI messages 214 and/or the payloads of the IPMI messages 214 to carry the firmware image 210 and the operation codes 212. The IPMI message component 172 may also include an indicator in the IPMI messages 214 to indicate that these messages carry data destined to the data operation component 136. The IPMI message component 172 then sends the IPMI messages 214 to the IPMI message handling component 134 at the BMC 102.

The IPMI message handling component 134 receives the IPMI messages 214. Based on the indicator, the IPMI message handling component 134 determines that the IPMI messages 214 carry data destined to the data operation component 136. The IPMI message handling component 134 knows the formats used by these messages and, accordingly, extracts the firmware image 210 and the operation codes 212 from the IPMI message 214. The IPMI message handling component 134 then sends the firmware image 210 and the operation codes 212 to the data operation component 136.

The data operation component 136 receives the firmware image 210 and the operation codes 212. Based on the operation codes 212, the data operation component 136 may determine that the data operation component 136 is requested to perform a particular data processing action on the firmware image 210 upon receiving the firmware image 210. In this example, the particular data processing action is a validation process. The data operation component 136 accordingly validates the firmware image 210 (e.g., to determine whether the received data are corrupted). When the particular data processing action returns a predetermined result (e.g., validation is successful), the data operation component 136 may proceed to the next step. Otherwise, the data operation component 136 may discard the firmware image 210 and may optionally notify the network device 170 that validation is not successful. Next, based on the operation codes 212, the data operation component 136 determines that the data received are a firmware image 210 and the target feature component of the received data is the feature component A 142 (i.e., the BMC firmware update feature in this example.) Accordingly, the data operation component 136 sends the firmware image 210 to the feature component A 142. The feature component A 142 receives the firmware image 210 and updates the firmware used by the BMC 102. Further, the operation codes 212 may indicate to the data operation component 136 to instruct the feature component A 142 to restart the BMC 102. Thus, the data operation component 136 may wait a time period for the feature component A 142 to complete updating the firmware. Then, the data operation component 136 may send an instruction 216 to the feature component A 142, instructing the feature component A 142 to restart the BMC 102.

Figure 3:
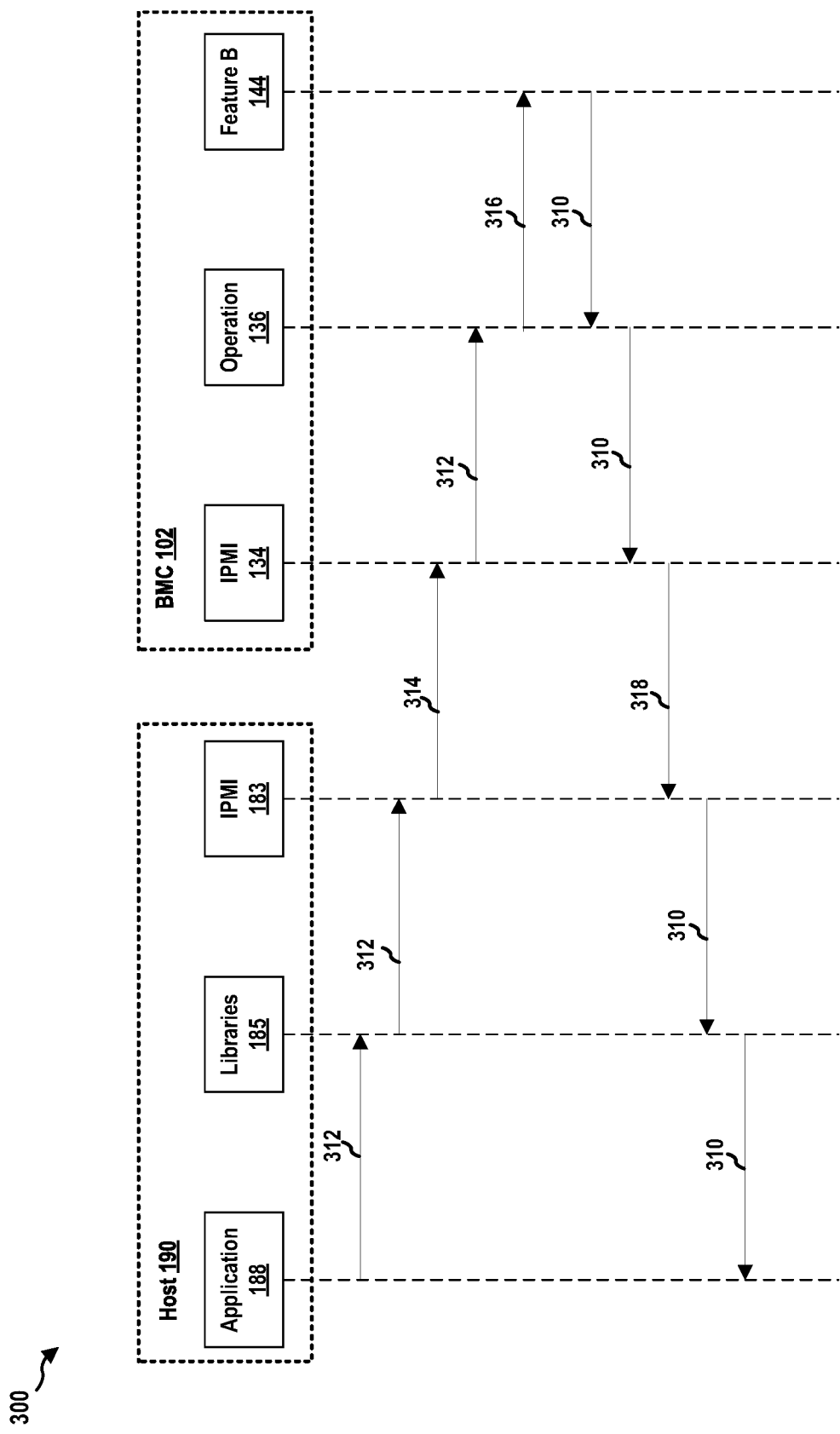
FIG. 3 is a diagram illustrating a sequence of operations for transferring data from a feature component of a BMC to a client application.

FIG. 3 is a diagram 300 illustrating a sequence of operations for transferring data from a feature component of a BMC to a client application. In this example, the BIOS 184 stores its log files at the feature component B 144 (e.g., a BIOS management feature) of the BMC 102 as backup. The feature component B 144 may also provide other features (e.g., BIOS update) for managing the BIOS 184. Further, in this example, the host application 188 is a BIOS management application and may want to retrieve the backup log files of the BIOS 184 stored at the feature component B 144.

Accordingly, the host application 188 may call a function of the data operation function libraries 185. The host application 188 provides one or more operation codes 312 to the function as parameters of the function. The operation codes 312 are configured to indicate to the data operation component 136 of the BMC 102 (as described infra) that BIOS log files 310 are to be obtained from the feature component B 144 and transferred to the host computer 190 in this example.

The data operation function libraries 185 receive, through the function called by the host application 188, the operation codes 312. Based on the operation codes 312, the data operation function libraries 185 can determine that the BIOS log files 310 are to be transferred from the BMC 102 to the host application 188. The data operation function libraries 185 then send the operation codes 312 to the IPMI message component 183, and indicate that the operation codes 312 are to be sent to the BMC 102. The IPMI message component 183 constructs, e.g., under the instructions of the data operation function libraries 185, one or more IPMI messages 314 and uses specific fields of the IPMI messages 314 and/or the payloads of the IPMI messages 314 to carry the operation codes 312. The IPMI message component 183 may also include an indicator in the IPMI messages 314 to indicate that these messages carry data destined to the data operation component 136. The IPMI message component 183 then sends the IPMI messages 314 to the IPMI message handling component 134 at the BMC 102.

The IPMI message handling component 134 receives the IPMI messages 314. Based on the indicator, the IPMI message handling component 134 determines that the IPMI messages 314 carry data destined to the data operation component 136. The IPMI message handling component 134 knows the formats used by these messages and, accordingly, extracts the operation codes 312 and any data contained therein from the IPMI message 314. The IPMI message handling component 134 then sends the operation codes 312 and the data, if any, to the data operation component 136.

The data operation component 136 receives the operation codes 312. Based on the operation codes 312, the data operation component 136 determines that a requester (e.g., the host application 188) requests the BIOS log files 310 the feature component B 144 (i.e., the BIOS management feature component in this example). Further, the data operation component 136 may determine that the BIOS log files 310 are stored at a particular location (e.g., a particular storage device of the BMC 102). Accordingly, the data operation component 136 may send an instruction 316 to the feature component B 144, instructing the feature component B 144 to return the BIOS log files 310 at the particular location to the data operation component 136. The feature component B 144 sends the BIOS log files 310 to the data operation component 136. The data operation component 136 in turn sends the BIOS log files 310 to the IPMI message handling component 134 as the response to the request/call received that includes the operation codes 312.

The IPMI message handling component 134 constructs, e.g., under the instructions of the data operation component 136, one or more IPMI messages 318 and uses specific fields of the IPMI messages 314 and/or the payloads of the IPMI messages 314 to carry the BIOS log files 310. The IPMI message handling component 134 then sends the IPMI messages 318 to the IPMI message component 183 of the host computer 190 as the response to the IPMI message 314.

The IPMI message component 183 receives the IPMI messages 318 and accordingly extracts the BIOS log files 310 from those messages. The IPMI message component 183 then sends the BIOS log files 310 to the data operation function libraries 185. The data operation function libraries 185 then send the BIOS log files 310 to the host application 188 as the return of the function called by the host application 188 to obtain the BIOS log files 310.

As described supra, the common data operation mechanism (e.g., the data operation component 136 and the data operation function libraries 174/data operation function libraries 185) may read data from various feature components at a BMC (e.g., the BMC 102). In particular, a client may utilize the mechanism to obtain a large amount data from the BMC. For example, the BIOS 184 on the host computer 190 may use the mechanism to obtain a large amount of data from the BMC, e.g., for updating the BIOS or for recovering a set of BIOS specific data (which are stored at the BMC as a backup).

Further, a client may utilize the mechanism to write data to various feature components at a BMC. In particular, a client may utilize the mechanism to transfer a large file containing the firmware images that can be used for updating the BMC or other components. A BIOS on a host may utilize the mechanism to save a large amount of data at a BMC as backup and for later use.

Further, as described supra, in certain circumstances, following a write (e.g., transferring data) to the BMC, a client may request the data operation mechanism to perform a subsequent operation. For example, when the data operation mechanism receives an image for firmware update, the data operation mechanism may be request to perform a validation operation to determine if the image is intact and not tampered.

In addition, as described supra, the data operation mechanism may use operation codes to indicate one or more of target feature components, a location for a data collection, a data processing action on completion for write operation, etc.

Figure 4:
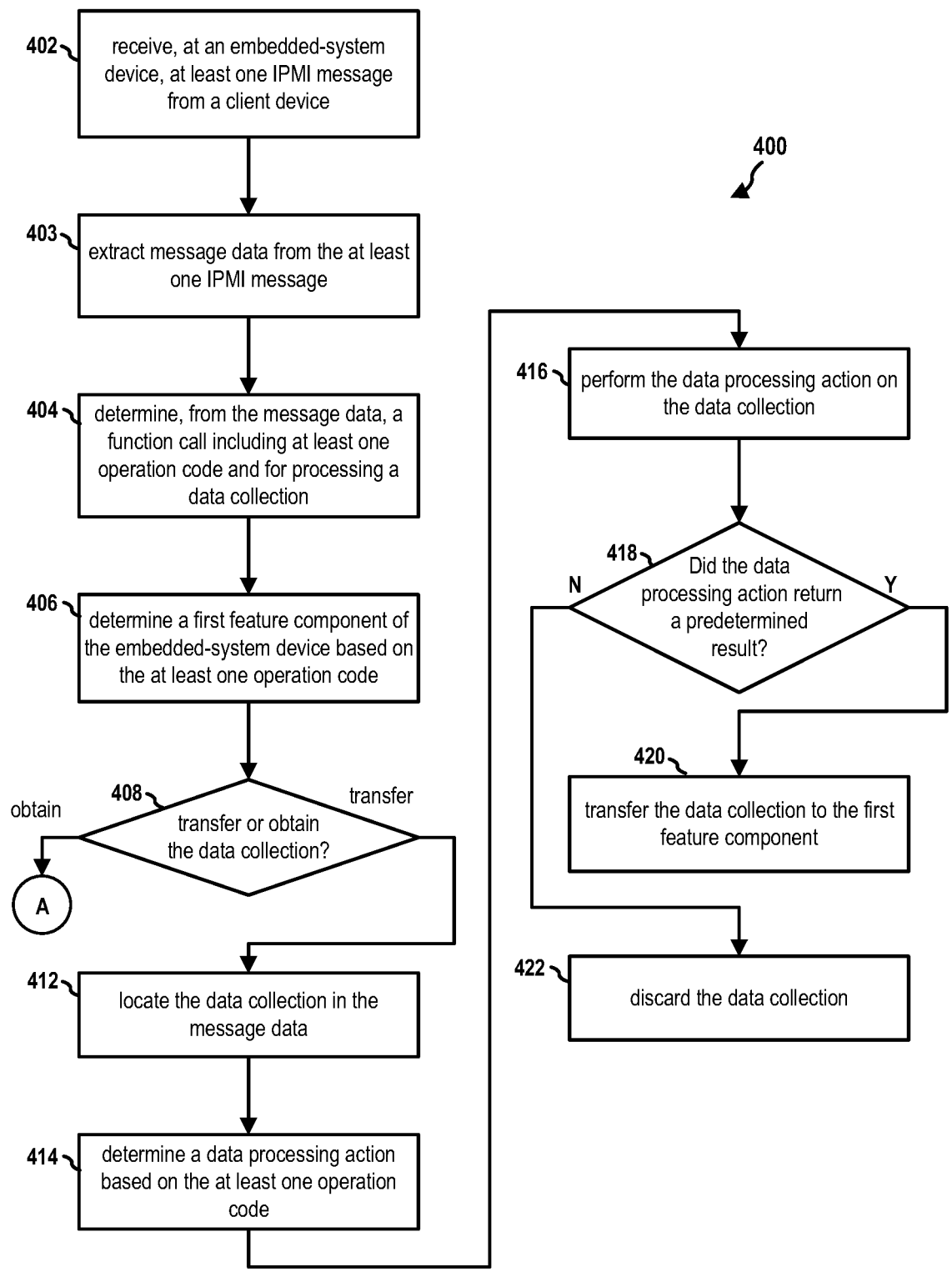
FIG. 4 is a flow chart of a method (process) for utilizing a common data operation mechanism to transfer data.

FIG. 4 is a flow chart 400 of a method (process) for utilizing a common data operation mechanism to transfer data. The method may be performed by an embedded-system device (e.g., the BMC 102, the apparatus 102'). At operation 402, the embedded-system device (e.g., via the IPMI message handling component 134) receives at least one IPMI message (e.g., the IPMI messages 214, the IPMI messages 314) from a client device (e.g., the network device 170, the host computer 190). At operation 403, the embedded-system device (e.g., via the IPMI message handling component 134) extracts message data from the at least one IPMI message. At operation 404, the embedded-system device (e.g., via the data operation component 136) determines, from the message data, a function call (e.g., a call by the network device 170 or the host computer 190 to transfer data to or from the BMC 102) including at least one operation code (e.g., the operation codes 212, the operation codes 312) and for processing a data collection (e.g., the firmware image 210, the BIOS log files 310). At operation 406, the embedded-system device (e.g., via the data operation component 136) determines a first feature component (e.g., the feature component A 142, the feature component B 144) of the embedded-system device based on the at least one operation code. At operation 408, the embedded-system device determines whether to transfer the data collection to the first feature component or to obtain the data collection from the first feature component based on the at least one operation code.

Figure 5:
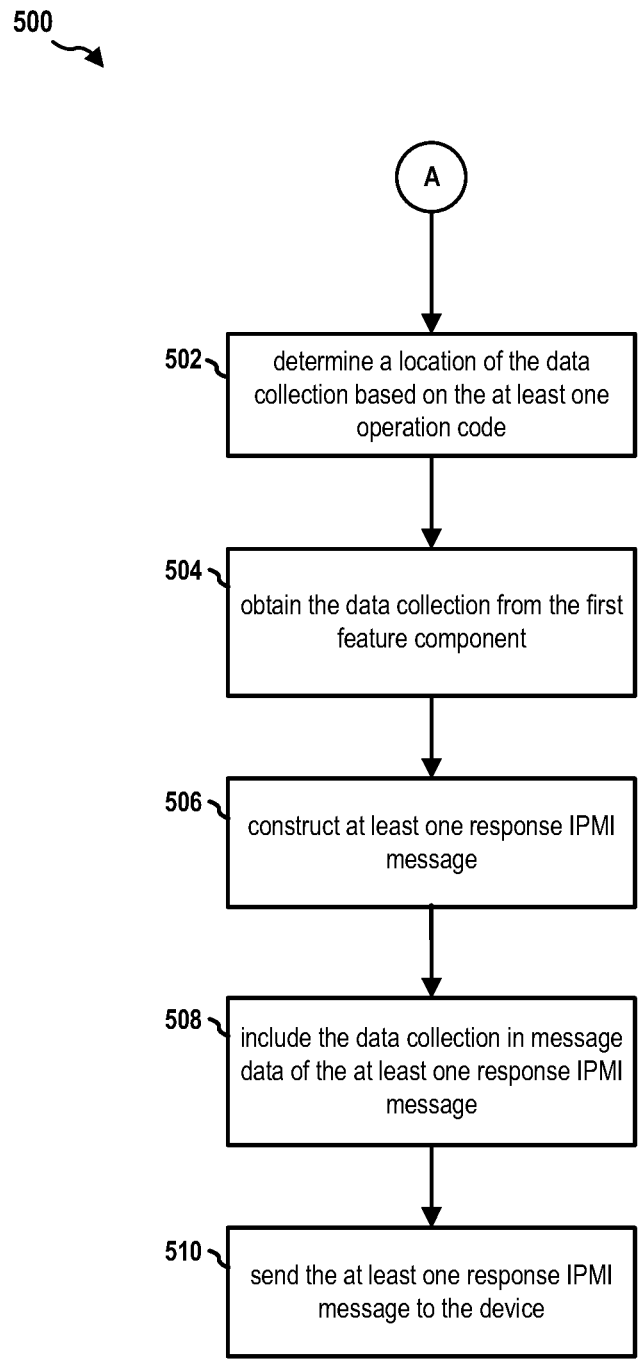
FIG. 5 is a flow chart of another method (process) for utilizing a common data operation mechanism to transfer data.

When the embedded-system device determines to obtain the data collection from the first feature component, the embedded-system device enters operation 502 in FIG. 5. When the embedded-system device determines to transfer the data collection to the first feature component (e.g., the feature component A 142), the embedded-system device, at operation 412, locates the data collection (e.g., the firmware image 210) in the message data (e.g., of the IPMI messages 214). At operation 414, the embedded-system device determines a data processing action (e.g., validation) based on the at least one operation code. At operation 416, the embedded-system device performing the data processing action on the data collection. At operation 418, the embedded-system device determines whether the data processing action returned a predetermined result. When the data processing action returned the predetermined result, the embedded-system device, at operation 420, transfers the data collection to the first feature component. When the data processing action did not return the predetermined result, the embedded-system device, at operation 422, may discard the data collection.

FIG. 5 is a flow chart 500 of another method (process) for utilizing a common data operation mechanism to transfer data. The method may be performed by an embedded-system device (e.g., the BMC 102, the apparatus 102') following operation 408 in FIG. 4. When, at operation 408, the embedded-system device determines to obtain the data collection (e.g., the BIOS log files 310) from the first feature component (e.g., the feature component B 144) and to transfer the data collection to the client device (e.g., the host computer 190) based on the at least one operation code (e.g., the operation codes 312), the embedded-system device, at operation 502, determines a location (e.g., a storage device of the BMC 102) of the data collection based on the at least one operation code. At operation 504, the embedded-system device obtains the data collection from the first feature component at the location. At operation 506, the embedded-system device constructs at least one response IPMI message. At operation 508, the embedded-system device includes the data collection in message data of the at least one response IPMI message (e.g., the IPMI messages 318). At operation 510, the embedded-system device sends the at least one response IPMI message to the client device.

Figure 6:
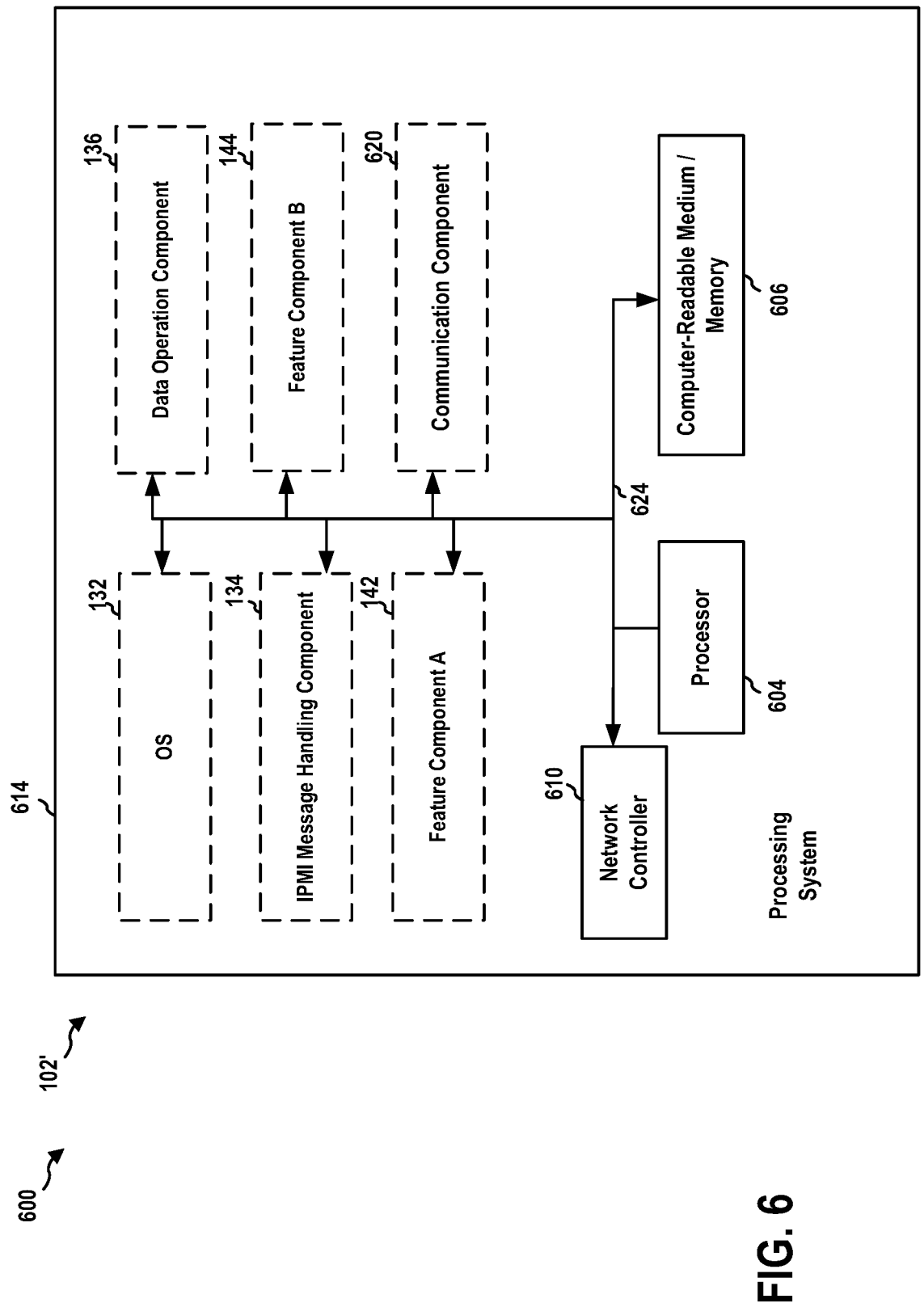
FIG. 6 is a diagram illustrating an example of a hardware implementation for an apparatus employing a processing system.

FIG. 6 is a diagram 600 illustrating an example of a hardware implementation for an apparatus 102' employing a processing system 614. The apparatus 102' may implement the BMC 102. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the OS 132, the IPMI message handling component 134, the data operation component 136, the feature component A 142, the feature component B 144, and the computer-readable medium/memory 606. In particular, the computer-readable medium/memory 606 may include the memory 114 and the storage 117. The bus 624 may also link various other circuits such as timing sources, peripherals, voltage regulators, and power management circuits, which are well known in the art, and therefore, will not be described any further.

The processing system 614 may be coupled to a network controller 610. The network controller 610 provides a means for communicating with various other apparatus over a network. The network controller 610 receives a signal from the network, extracts information from the received signal, and provides the extracted information to the processing system 614, specifically a communication component 620 of the apparatus 102'. In addition, the network controller 610 receives information from the processing system 614, specifically the communication component 620, and based on the received information, generates a signal to be sent to the network. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system further includes at least one of the OS 132, the IPMI message handling component 134, the data operation component 136, the feature component A 142, the feature component B 144. The components may be software components running in the processor 604, resident/stored in the computer readable medium/memory 606, one or more hardware components coupled to the processor 604, or some combination thereof.

The apparatus 102' may be configured to include means for performing certain operations described supra referring to FIG. 4. The aforementioned means may be one or more of the aforementioned components of the apparatus 102' and/or the processing system 614 of the apparatus 102' configured to perform the functions recited by the aforementioned means.

Figure 7:
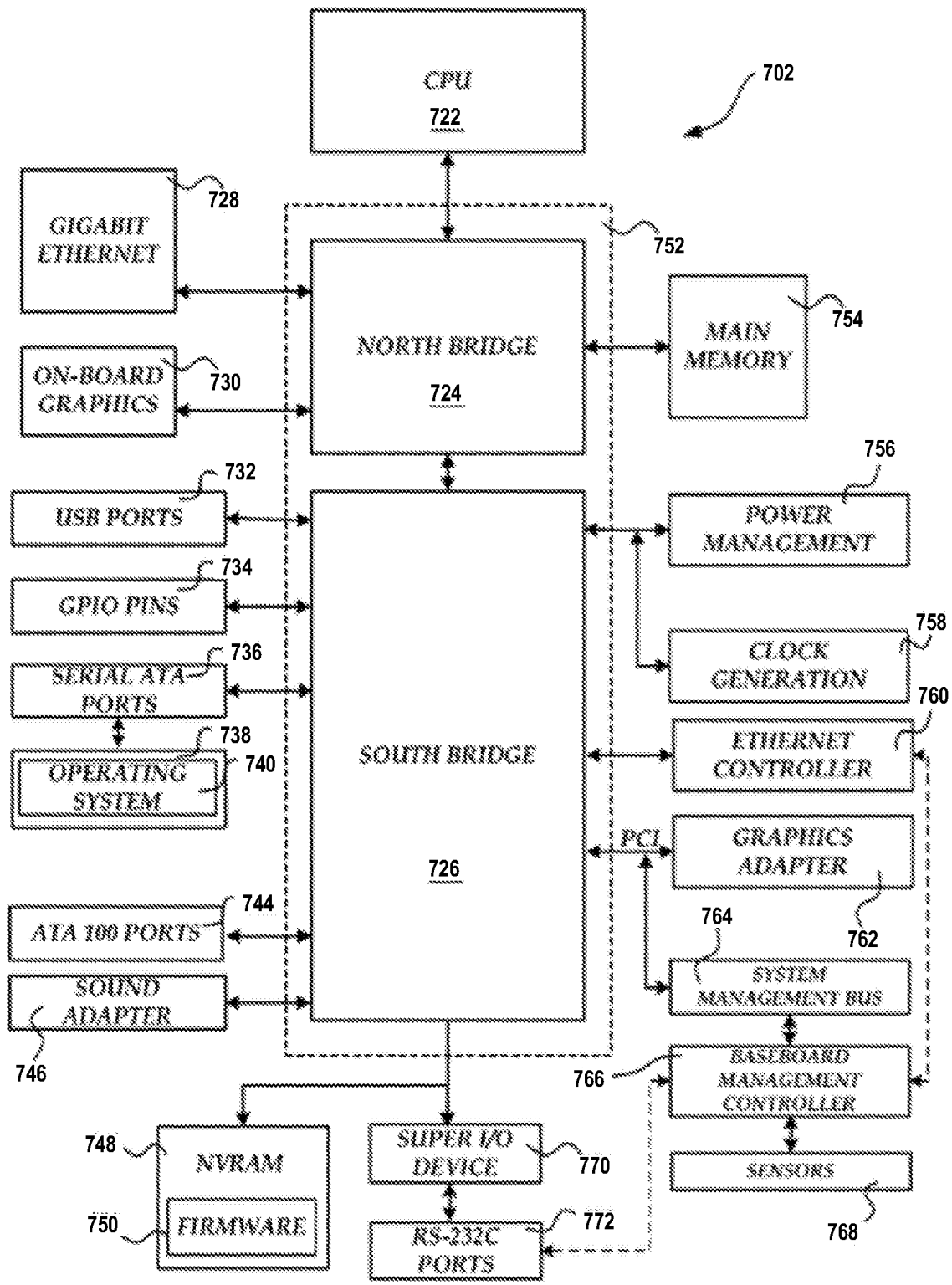
FIG. 7 shows a computer architecture for a computer.

FIG. 7 and the following discussion are intended to provide a brief, general description of one suitable computing environment in which aspects of the embodiments described herein may be implemented. In particular, FIG. 7 shows a computer architecture for a computer 702 that may be utilized to embody the host computer 190, as described supra. It should be appreciated that the computer architecture shown in FIG. 7 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 702 shown in FIG. 7 includes a baseboard, or "motherboard," which is a printed circuit board to which a multitude of components or devices may be connected by way of a system bus or other electrical communication path. In one illustrative embodiment, a CPU 722 operates in conjunction with a chipset 752. The CPU 722 is a standard central processor that performs arithmetic and logical operations necessary for the operation of the computer. The server computer 702 may include a multitude of CPUs 722.

The chipset 752 includes a north bridge 724 and a south bridge 726. The north bridge 724 provides an interface between the CPU 722 and the remainder of the computer 702. The north bridge 724 also provides an interface to a random access memory ("RAM") used as the main memory 754 in the computer 702 and, possibly, to an on-board graphics adapter 730. The north bridge 724 may also include functionality for providing networking functionality through a gigabit Ethernet adapter 728. The gigabit Ethernet adapter 728 is capable of connecting the computer 702 to another computer via a network. Connections which may be made by the network adapter 728 may include LAN or WAN connections. LAN and WAN networking environments are commonplace in offices, enterprise-wide computer networks, intranets, and the internet. The north bridge 724 is connected to the south bridge 726.

The south bridge 726 is responsible for controlling many of the input/output functions of the computer 702. In particular, the south bridge 726 may provide one or more USB ports 732, a sound adapter 746, an Ethernet controller 760, and one or more GPIO pins 734. The south bridge 726 may also provide a bus for interfacing peripheral card devices such as a graphics adapter 762. In one embodiment, the bus comprises a PCI bus. The south bridge 726 may also provide a system management bus 764 for use in managing the various components of the computer 702. Additional details regarding the operation of the system management bus 764 and its connected components are provided below.

The south bridge 726 is also operative to provide one or more interfaces for connecting mass storage devices to the computer 702. For instance, according to an embodiment, the south bridge 726 includes a serial advanced technology attachment ("SATA") adapter for providing one or more SATA ports 736 and an ATA 100 adapter for providing one or more ATA 100 ports 744. The SATA ports 736 and the ATA 100 ports 744 may be, in turn, connected to one or more mass storage devices such as the SATA disk drive 738 storing an operating system 740 and application programs.

As known to those skilled in the art, an operating system 740 comprises a set of programs that control operations of a computer and allocation of resources. An application program is software that runs on top of the operating system software, or other runtime environment, and uses computer resources to perform application specific tasks desired by the user. According to one embodiment of the invention, the operating system 740 comprises the LINUX operating system. According to another embodiment of the invention the operating system 740 comprises an operating system within the WINDOWS family of operating systems from MICROSOFT CORPORATION. According to another embodiment, the operating system 740 comprises the UNIX, LINUX, or SOLARIS operating system. It should be appreciated that other operating systems may also be utilized.

The mass storage devices connected to the south bridge 726, and their associated computer storage media, provide non-volatile storage for the computer 702. Although the description of computer storage media contained herein refers to a mass storage device, such as a hard disk or CD-ROM drive, it should be appreciated by those skilled in the art that computer storage media can be any available media that can be accessed by the computer 702.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer storage media such as a ROM or a flash memory such as a NVRAM 748 for storing the firmware 750 that includes program code containing the basic routines that help to start up the computer 702 and to transfer information between elements within the computer 702.

As described briefly above, the south bridge 726 may include a system management bus 764. The system management bus 764 may include a BMC 766. The BMC 766 may be the BMC 102. In general, the BMC 766 is a microcontroller that monitors operation of the computer system 702. In a more specific embodiment, the BMC 766 monitors health-related aspects associated with the computer system 702, such as, but not limited to, the temperature of one or more components of the computer system 702, speed of rotational components (e.g., spindle motor, CPU Fan, etc.) within the system, the voltage across or applied to one or more components within the system 702, and the available or used capacity of memory devices within the system 702. To accomplish these monitoring functions, the BMC 766 is communicatively connected to one or more components by way of the management bus 764. In an embodiment, these components include sensor devices 768 for measuring various operating and performance-related parameters within the computer system 702. The sensor devices 768 may be either hardware or software based components configured or programmed to measure or detect one or more of the various operating and performance-related parameters.

It should also be appreciated that the computer 702 may comprise other types of computing devices, including handheld computers, embedded computer systems, personal digital assistants, and other types of computing devices known to those skilled in the art. It is also contemplated that the computer 702 may not include all of the components shown in FIG. 7, may include other components that are not explicitly shown in FIG. 7, or may utilize an architecture completely different than that shown in FIG. 7.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a system including a host computer and an embedded-system device, comprising:
    calling, by a host application that is a software component running on a processor of the host computer, a data operation function running on the host computer with at least one operation code indicating an identity of a data collection and an identity of a first feature component of the embedded-system device holding the data collection, wherein the embedded-system device is a baseboard management controller (BMC) managing the host computer, wherein the BMC receives and stores data generated by a Basic Input/Output System (BIOS) executed on the processor of the host computer;
    instructing, by the data operation function, an Intelligent Platform Management Interface (IPMI) message component of the host computer to send at least one IPMI message containing the at least one operation code to the embedded-system device;
    receiving, at an IPMI component of the embedded-system device, the at least one IPMI message from the host computer;
    extracting, at the IPMI component of the embedded-system device, message data from the at least one IPMI message;
    sending the message data to a data operation component of the embedded-system device, the data operation component being different from the IPMI component;
    determining, at the data operation component and from the message data, the at least one operation code;
    determining, at the data operation component, the first feature component of the embedded-system device from a plurality of feature components based on the at least one operation code, each of the plurality of feature components being a software component executed on a processor of the embedded-system device; and
    obtaining, at the data operation component, the data collection from the first feature component when the at least one operation code indicates a data request.

2. The method of claim 1, further comprising:
    determining to transfer the data collection to the first feature component when the at least one operation code indicates a data transfer;
    locating the data collection in the message data; and
    transferring the data collection to the first feature component.

3. The method of claim 2, further comprising:
    determining a data processing action based on the at least one operation code; and
    performing the data processing action on the data collection, wherein the transferring the data collection to the first feature component is performed when the data processing action returns a predetermined result.

4. The method of claim 1, further comprising:
    determining that the at least one operation code indicates the data request prior to the obtaining the data collection from the first feature component; and
    transferring the data collection to the host computer subsequent to the obtaining the data collection.

5. The method of claim 4, further comprising:
    determining a location of the data collection based on the at least one operation code, wherein the data collection is obtained from the location.

6. The method of claim 4, wherein the transferring the data collection to the host computer includes:
    constructing at least one response IPMI message;
    including the data collection in message data of the at least one response IPMI message; and
    sending the at least one response IPMI message to the host computer.

7. An apparatus, the apparatus being a system including a host computer comprising:
    a first memory; and
    first at least one processor coupled to the first memory and configured to:
        call, by a host application that is a software component running on the first at least one processor of the host computer, a data operation function running on the host computer with at least one operation code indicating an identity of a data collection and an identity of a first feature component of embedded-system device holding the data collection, wherein the embedded-system device is a baseboard management controller (BMC) managing the host computer, wherein the BMC receives and stores data generated by a Basic Input/Output System (BIOS) executed on the processor of the host computer;
        instruct, by the data operation function, an Intelligent Platform Management Interface (IPMI) message component of the host computer to send at least one IPMI message containing the at least one operation code to the embedded-system device;

and an embedded-system device comprising:
- a second memory; and
- second at least one processor coupled to the second memory and configured to:
  - receive, at an IPMI component of the embedded-system device, at least one IPMI message from the host computer;
  - extract, at the IPMI component of the embedded-system device, message data from the at least one IPMI message;
  - send the message data to a data operation component of the embedded-system device, the data operation component being different from the IPMI component;
  - determine, at the data operation component and from the message data, the at least one operation code;
  - determine, at the data operation component, the first feature component of the embedded-system device from a plurality of feature components based on the at least one operation code, each of the plurality of feature components being a software component executed on the second at least one processor of the embedded-system device; and
  - obtain, at the data operation component, the data collection from the first feature component when the at least one operation code indicates a data request.

8. The apparatus of claim 7, wherein the second at least one processor is further configured to:
- determine to transfer the data collection to the first feature component when the at least one operation code indicates a data transfer;
- locate the data collection in the message data; and
- transfer the data collection to the first feature component.

9. The apparatus of claim 8, wherein the second at least one processor is further configured to:
- determine a data processing action based on the at least one operation code; and
- perform the data processing action on the data collection, wherein the transferring the data collection to the first feature component is performed when the data processing action returns a predetermined result.

10. The apparatus of claim 7, wherein the second at least one processor is further configured to:
- determining that the at least one operation code indicates the data request prior to the obtaining the data collection from the first feature component; and
- transfer the data collection to the host computer subsequent to the obtaining the data collection.

11. The apparatus of claim 10, wherein the second at least one processor is further configured to:
- determine a location of the data collection based on the at least one operation code, wherein the data collection is obtained from the location.

12. The apparatus of claim 10, wherein to transfer the data collection to the host computer, the second at least one processor is further configured to:
- construct at least one response IPMI message;
- include the data collection in message data of the at least one response IPMI message; and
- send the at least one response IPMI message to the host computer.

13. A non-transitory computer-readable medium storing computer executable code for operating a system including a host computer and an embedded-system device, comprising code to:

call, by a host application that is a software component running on a processor of the host computer, a data operation function running on the host computer with at least one operation code indicating an identity of a data collection and an identity of a first feature component of the embedded-system device holding the data collection, wherein the embedded-system device is a baseboard management controller (BMC) managing the host computer, wherein the BMC receives and stores data generated by a Basic Input/Output System (BIOS) executed on the processor of the host computer;

instruct, by the data operation function, an Intelligent Platform Management Interface (IPMI) message component of the host computer to send at least one IPMI message containing the at least one operation code to the embedded-system device;

receive, at an IPMI component of the embedded-system device, at least one IPMI message from the host computer;

extract, at the IPMI component of the embedded-system device, message data from the at least one IPMI message;

send the message data to a data operation component of the embedded-system device, the data operation component being different from the IPMI component;

determine, at the data operation component and from the message data, a the at least one operation code; and determine, at the data operation component, the first feature component of the embedded system device from a plurality of feature components based on the at least one operation code, each of the plurality of feature components being a software component executed on a processor of the embedded-system device; and obtain, at the data operation component, the data collection from the first feature component when the at least one operation code indicates a data request.

14. The non-transitory computer-readable medium of claim 13, wherein the code is further configured to:
- determine to transfer the data collection to the first feature component based on the at least one operation code;
- locate the data collection in the message data; and
- transfer the data collection to the first feature component.

15. The non-transitory computer-readable medium of claim 14, wherein the code is further configured to:
- determine a data processing action based on the at least one operation code; and
- perform the data processing action on the data collection, wherein the transferring the data collection to the first feature component is performed when the data processing action returns a predetermined result.

16. The non-transitory computer-readable medium of claim 13, wherein the code is further configured to:
- determining that the at least one operation code indicates the data request prior to the obtain the data collection from the first feature component; and
- transfer the data collection to the host computer subsequent to the obtaining the data collection.

17. The non-transitory computer-readable medium of claim 16, wherein the code is further configured to:
- determine a location of the data collection based on the at least one operation code, wherein the data collection is obtained from the location;
- wherein to transfer the data collection to the host computer, the code is further configured to:
  - construct at least one response IPMI message;
  - include the data collection in message data of the at least one response IPMI message; and send the at least one response IPMI message to the host computer.

* * * * *